(12) United States Patent
Ito

(10) Patent No.: US 7,864,860 B2
(45) Date of Patent: Jan. 4, 2011

(54) IMAGE PICKUP APPARATUS AND MOTION VECTOR DECIDING METHOD

(75) Inventor: Kenji Ito, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1311 days.

(21) Appl. No.: 11/395,218

(22) Filed: Apr. 3, 2006

(65) Prior Publication Data

US 2006/0221215 A1 Oct. 5, 2006

(30) Foreign Application Priority Data

Apr. 4, 2005 (JP) .............................. 2005-107910

(51) Int. Cl.
*H04N 7/12* (2006.01)
(52) U.S. Cl. ........................... 375/240.16; 375/240.26; 348/345; 348/349
(58) Field of Classification Search ............ 375/240.16, 375/240.26; 348/345, 349
See application file for complete search history.

(56) References Cited

U.S. PATENT DOCUMENTS

2001/0028798 A1* 10/2001 Manowitz et al. ........... 396/429

2002/0145667 A1* 10/2002 Horiuchi ................. 348/207.99

FOREIGN PATENT DOCUMENTS

| JP | 5-22645    | 1/1993 |
| JP | 2004-15376 | 1/2004 |

OTHER PUBLICATIONS

Japan Patent Office Notice of Reason(s) for Rejection dated Jan. 5, 2010, with English translation.

* cited by examiner

*Primary Examiner*—Tung Vo
*Assistant Examiner*—Anner Holder
(74) *Attorney, Agent, or Firm*—McGinn IP Law Group, PLLC

(57) ABSTRACT

According to the apparatus and method of the present invention, the motion vector Vij is weighted by the weighting coefficient αij of the motion vector Vij decided based on the AF evaluation value Iij indicating the degree of sharpness of the subject image so as to decide the entire motion vector V. For this reason, it is possible to reduce an influence on the decision of the motion vector V of the entire image exerted by the motion vector of the object of a low degree of sharpness, that is, the object not focused on.

3 Claims, 7 Drawing Sheets

FIG.7A
FIG.7B
FIG.7C
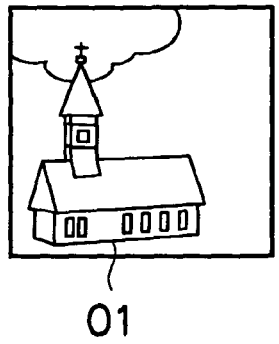
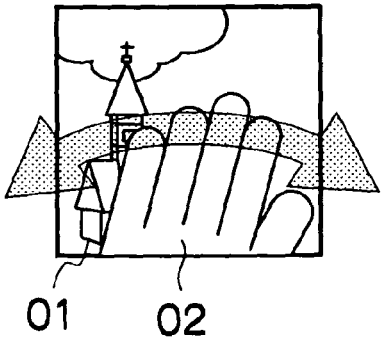
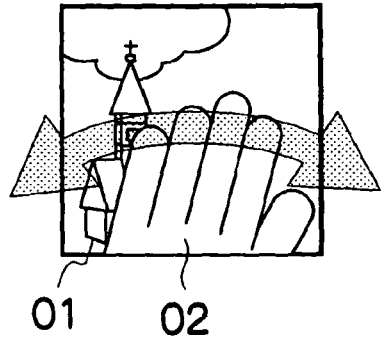
ERRONEOUS DECISION
RELATED ART

IMAGE PICKUP APPARATUS AND MOTION VECTOR DECIDING METHOD

BACKGROUND OF THE INVENTION

1. Field of the Invention

The present invention relates to an image pickup apparatus and a motion vector deciding method, and in particular, to a technology for deciding a motion vector by using an AF evaluation value indicating a degree of sharpness of a subject image.

2. Description of the Related Art

As for conventional electrical image stabilization, there are various technologies for detecting a correct motion vector. For instance, Japanese Patent Application Laid-Open No. 5-22645 provides a peripheral motion vector detection circuit for obtaining a motion vector from a video signal of a screen periphery, a peripheral motion vector processing circuit for processing the motion vector detected from the peripheral motion vector detection circuit, a central motion vector detection circuit for obtaining a motion vector from the video signal of a screen center and a central motion vector processing circuit for processing the motion vector detected from the central motion vector detection circuit, where determination of reliability by means of divergence determination data is only performed in the central motion vector processing circuit to process the motion vector according to a position on the screen. Therefore, it is possible, with a small circuit scale, to determine the reliability of the motion vector correctly and perform effective motion detection.

SUMMARY OF THE INVENTION

As shown in FIGS. 7A to 7C, if an object O2 such as a hand crosses the screen center when focusing on an object O1 as a subject, the conventional technology determines the reliability of the object O2. For this reason, there arises an inconvenience of mistakenly performing image stabilization to the object O1 as the subject based on motion of the object O2 unrelated to the subject O1. The present invention has been made in view of this problem, and an objective thereof is to prevent the object unrelated to the subject from adversely affecting a motion vector decision.

To solve the above-described problem, the present invention provides an image pickup apparatus comprising: an imaging portion which photoelectrically converts a subject image and obtains a frame image of a subject; a first motion vector deciding portion which decides a motion vector Vij of each of segmented regions Dij (i=1 to M, j=1 to N) made by segmenting the frame image of the subject into multiple matrix domains of M lines×N rows; an AF evaluation value calculating portion which calculates an AF evaluation value indicating a degree of sharpness of the subject image from the frame image of the subject; a coefficient deciding portion which decides a weighting coefficient αij of each motion vector Vij based on the AF evaluation value calculated by the AF evaluation value calculating portion; and a second motion vector deciding portion which decides an entire motion vector V of the frame image of the subject by weighting the motion vector Vij based on the weighting coefficient αij.

The image pickup apparatus of the present invention decides the weighting coefficient αij of each motion vector Vij based on the AF evaluation value indicating the degree of sharpness of the subject image. For this reason, it is possible to reduce an influence on the decision of the motion vector V of the entire image exerted by the motion vector of the object not focused on.

The AF evaluation value calculating portion may calculate an AF evaluation value Iij indicating the degree of sharpness of the subject image in the segmented region Dij, and the coefficient deciding portion may decide the weighting coefficient αij of each motion vector Vij based on the AF evaluation value Iij.

It is preferable that the coefficient deciding portion decides the weighting coefficient αij so that a size of the coefficient correlates with a size of the AF evaluation value Iij.

The entire motion vector V may be decided by the following.

$$V = \sum_i \sum_j \alpha_{ij} V_{ij} \Big/ \sum_i \sum_j \alpha_{ij}$$

The image pickup apparatus of the present invention may further comprise an image stabilizing portion which stabilizes the frame image according to the entire motion vector V.

To solve the above-described problem, the present invention also provides a motion vector deciding method comprising steps of: photoelectrically converting a subject image and obtaining a frame image of a subject; deciding a motion vector Vij of each of segmented regions Dij (i=1 to M, j=1 to N) made by segmenting the frame image of the subject into multiple matrix domains of M rows×N lines; calculating an AF evaluation value indicating a degree of sharpness of the subject image from the frame image of the subject; deciding a weighting coefficient αij of each motion vector Vij based on the AF evaluation value calculated by the AF evaluation value calculating portion; and deciding an entire motion vector V of the frame image of the subject by weighting the motion vector Vij based on the weighting coefficient αij.

As described above, the image pickup apparatus and method of the present invention decides the weighting coefficient αij of each motion vector Vij based on the AF evaluation value indicating the degree of sharpness of the subject image. For this reason, it is possible to reduce an influence on the decision of the motion vector V of the entire image exerted by the motion vector of the object not focused on.

BRIEF DESCRIPTION OF THE DRAWINGS

FIGS. 7A to 7C are diagrams showing a state in which an object unrelated to a focused object is crossing a screen.

DETAILED DESCRIPTION OF THE PREFERRED EMBODIMENTS

Hereunder, a preferable embodiment of the present invention will be described by referring to the attached drawings.

Figure 1:
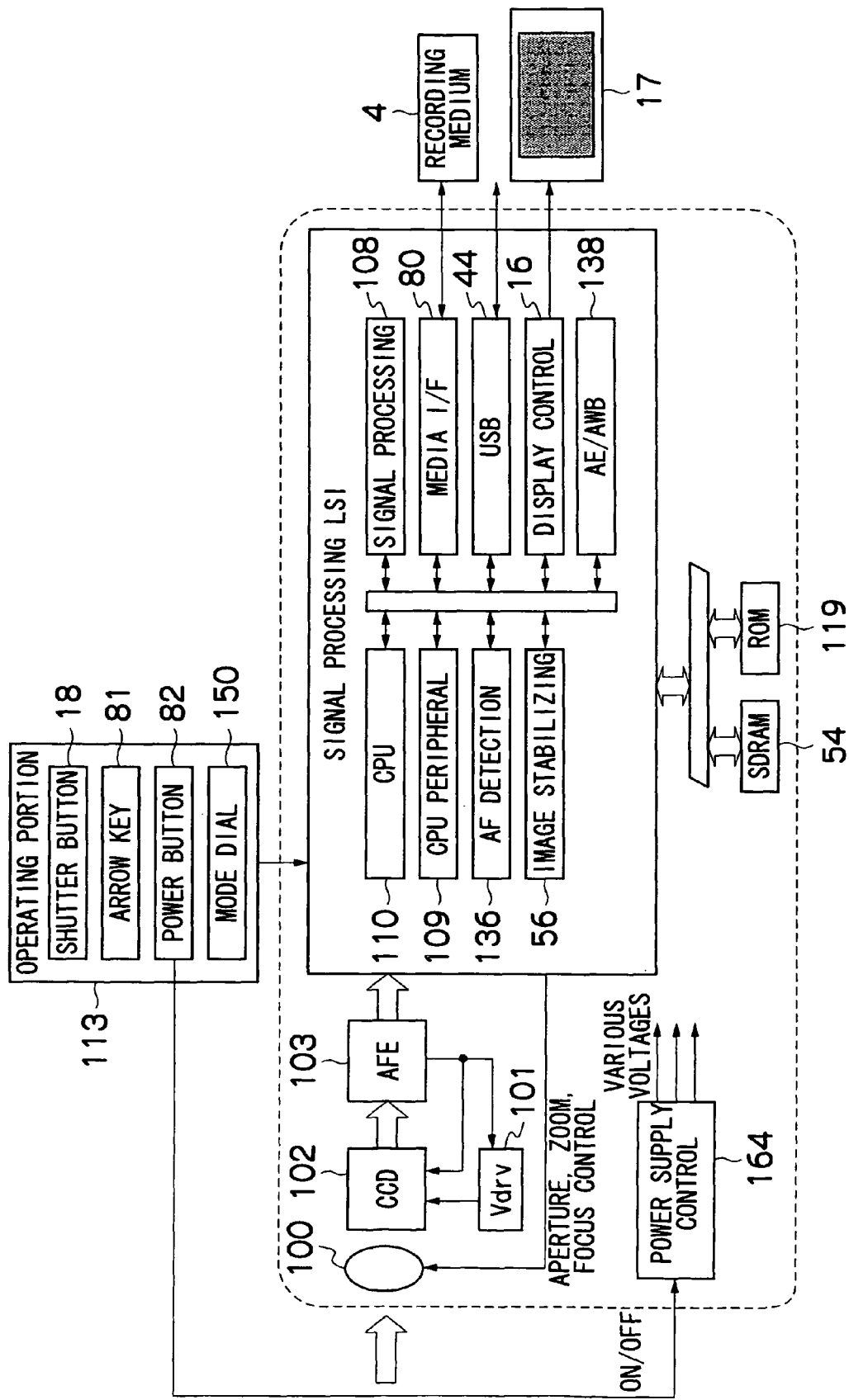
FIG. 1 is a block diagram of an image pickup apparatus according the present invention.

FIG. 1 is a block diagram showing an internal configuration of an image pickup apparatus 1 according to the preferable embodiment of the present invention.

A solid-state image sensor 102 such as a CCD is placed in the rear of an optical unit 100 including an imaging lens, a zoom lens and a focus lens, where light having passed through the imaging lens enters the solid-state image sensor 102. Photosensors arranged in a planar state on an acceptance surface of the solid-state image sensor 102, and a subject image focused on the acceptance surface is converted to signal charges of an amount according to incident light volume by each of the photosensors. The signal charges thus accumulated are sequentially read as voltage signals (image signals) according to the signal charges based on a pulse signal (vertical synchronizing signal) given from a driver circuit 101, and are converted to digital signals by an analog front end circuit (AFE) 103 so as to be added to a signal processing circuit 108.

The signal processing circuit 108 is an image processing device which includes a gain adjusting circuit and an A/D converter and also includes a luminance/color-difference signal generating circuit, a gamma-correction circuit, a sharpness-correction circuit, a contrast correction circuit, a white-balance correction circuit, a contour processing portion for performing image processing including a contour correction to a photographed image, a noise reduction processing portion for performing a noise reduction process of the image and the like, and processes the image signals according to a command form a CPU 110.

Image data processed by the signal processing circuit 108 is converted to the luminance signal (Y signal) and color-difference signal (Cr or Cl signal) and undergoes a predetermined process such as a gamma correction, and then DMA-transferred to and stored in an SDRAM 54 by a DMAC (DMA Controller) not shown without involving the CPU 110.

It is also possible to perform data processing such as a masking process or a γ conversion to the image data stored in the SDRAM 54 in a CPU peripheral circuit 109 so as to output a result thereof to the CPU 110.

The CPU 110 is a control circuit for exerting integrated control over the circuits of the image pickup apparatus 1. It controls operation of a corresponding circuit based on a signal received from an operating portion 113 including a shutter button 18, an arrow key 81, a power button 82 and a mode dial 150 or an information position specifying key, an electronic flash button, a zoom key, a menu/execute button and the like which are not shown. It also exerts display control of a display portion 17, electronic flash emission control, auto focus (AF) control, automatic exposure (AE) control and the like. A program executed by the CPU 110 is stored in an ROM 119.

In the case of monitor-outputting the photographed image to the display portion 17, an YC signal is read from the SDRAM 54 and transmitted to a display control portion 16. The display control portion 16 converts an inputted YC signal to a signal of a predetermined method for display (color complex video signal of an NTSC method for instance) and outputs it to the display portion 17.

The YC signal of each frame processed at a predetermined frame rate is alternately written to an area A and an area B of the SDRAM 54. Of the area A and area B of the SDRAM 54, the written YC signal is read from the area other than the area having the YC signal written therein. Thus, the YC signal in the SDRAM 54 is updated periodically, and the video signal generated from the YC signal is supplied to the display portion 17 so that the video just being taken is displayed on the display portion 17 in real time. A user can check an image-taking angle of view by means of the video (through image) displayed on the display portion 17.

The CPU 110 includes an OSD signal generating circuit, and the OSD signal generating circuit generates the signals for displaying characters and symbols including icons, such as a shutter speed, an aperture value, maximum number of shots, shooting date and time, a warning message and the like. The signals outputted from the OSD signal generating circuit are mixed with the image signals as required and supplied to the display portion 17. Thus, a synthetic image is displayed, which has the video of the characters and symbols synthesized with the through images and reproduced images.

Here, if the shutter button 18 is pushed halfway, AE and AF processes are started. To be more specific, the image signals outputted from the CCD 102 are A/D-converted and then inputted to an AF detection circuit 136 and an AE/AWB detection circuit 138.

The AE/AWB detection circuit 138 segments one screen into multiple regions (16×16 for instance) and includes a circuit for integrating RGB signals for each of the segmented regions so as to provide an integration value thereof to the CPU 110. The CPU 110 detects luminance (subject luminance) of the subject based on the integration value obtained from the AE/AWB detection circuit 138, and calculates an exposure value (photographing EV) suited to photographing. The aperture value and shutter speed are decided according to the acquired exposure value and a predetermined program diagram. According to this, the CPU 110 controls an electronic shutter of the CCD 102 and also controls the aperture of the optical unit 100 so as to obtain a proper exposure.

On automatic white balance adjustment, the AE/AWB detection circuit 138 calculates an average integration value of the RGB signals by color, and provides a calculation result thereof to the CPU 110. The CPU 110 acquires an integration value of R, an integration value of B and an integration value of G and acquires ratios of R/G and B/G in each of the segmented regions to determine a light source type based on distribution of the values of R/G and B/G in color spaces of R/G and B/G. In accordance with a white balance adjustment value suited to the determined light source type, the CPU 110 controls gain values (white balance correction values) for the R, G, and B signals of a white balance adjusting circuit so that the value of each of the ratios becomes approximately 1 (that is, an integration ratio of RGB on one screen is R:G:B 1:1:1) for instance so as to correct the signal of each of color channels.

As for the AF control, a contrast AF for moving a photographing lens to maximize a high-frequency component of a G signal of the image signal is applied for instance. The AF detection circuit 136 cuts the image signal in a predetermined region in the screen and integrates its absolute value.

Data on the integration values acquired by the AF detection circuit 136 is notified to the CPU 110. The CPU 110 calculates focus evaluation values (AF evaluation values) at multiple AF detection points while moving the photographing lens by controlling a motor driver not shown, and decides a lens position of a maximum evaluation value as a focusing position. The CPU 110 controls the motor driver to move the photographing lens to the acquired focusing position. The calculation of the AF evaluation values is not limited to an embodiment using the G signal but the luminance signal (Y signal) may also be used.

If a still image shooting mode is set by the mode dial 150 and the shutter button 18 is pushed, a photographing operation for still image recording is started. The image data obtained in response to pushing of the shutter button 18 is converted to a luminance/color-difference signal (Y/C signal) in the signal processing circuit 108, and is stored in the SDRAM 54 after undergoing the predetermined process such as a gamma correction. The signal processing circuit 108 may also perform the processing such as a white-balance adjustment, a sharpness adjustment, a red eye adjustment and the like as the predetermined process as appropriate.

The Y/C signal stored in the SDRAM 54 is compressed according to a predetermined format, and is then recorded on a recording medium 4 as an image file in the predetermined format such as an Exif file via a media I/F 80. The image file may also be outputted via a communication connector (such as a USB terminal 44) for sending and receiving information to and from another electronic device.

When a video shooting mode is set by the mode dial 150, a video recording operation is started in conjunction with a full pushing operation of the shutter button 18. The video recording operation is stopped by fully pushing the shutter button 18 again. It is also possible to perform a video recording operation while continuing fully pushing the shutter button 18 and stop it by releasing the full push. Video data is recorded on the recording medium 4 in a motion JPEG (MPEG) format for instance.

Every time the power button 82 is turned on, a power supply control portion 164 exerts control to have power supplied to circuits of the image pickup apparatus 1 from a main power supply consisting of batteries mounted inside a camera body.

Figure 2:
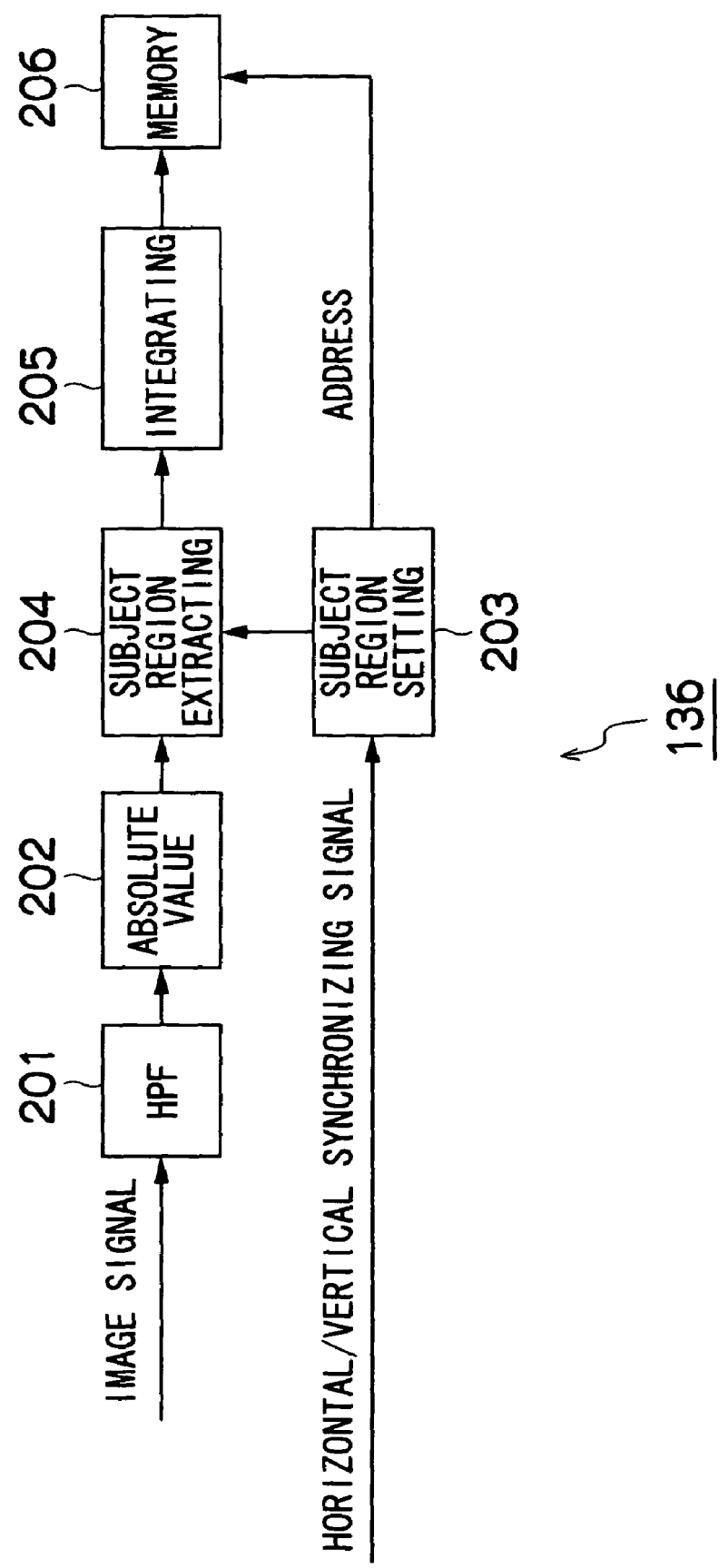
FIG. 2 is a block diagram of an AF detection circuit.
Figure 6:
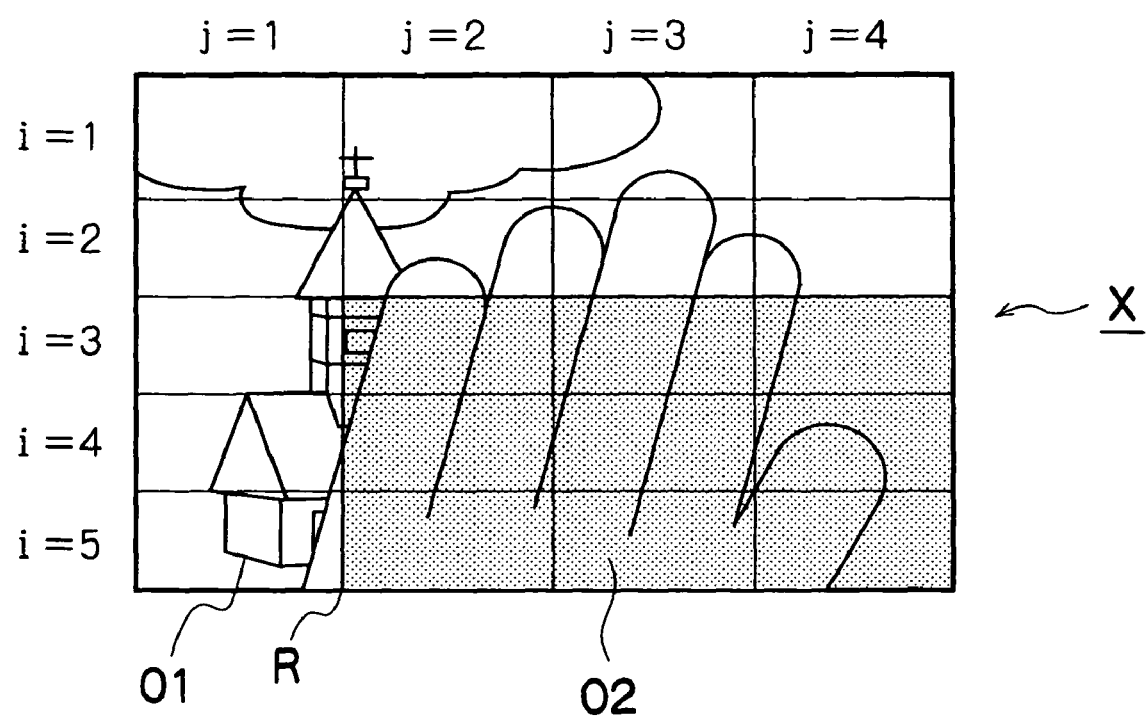
FIG. 6 is a diagram showing an example of a segmented region.

With reference to FIG. 2, the AF detection circuit 136 comprises a high-pass filter 201 for passing only the high-frequency component of a G signal, an absolute value processing portion 202, and a region setting portion 203 for setting a focus subject region out of segmented regions Eij made by segmenting one screen into P pieces in a horizontal (line) direction and Q pieces in a vertical (row) direction ($1 \leq i \leq P$, $1 \leq j \leq Q$). For instance, as shown in FIG. 6, the region setting portion 203 sets as the focus subject region each of the segmented regions Eij configuring the matrix domains having a screen X segmented into P=5 pieces in the horizontal direction and segmented into Q=4 pieces in the vertical direction.

The AF detection circuit 136 also comprises an extracting portion 204 for cutting out the signals in the segmented region Eij set as the focus subject by the region setting portion 203, an integrating portion 205 for integrating the absolute values in the extracted segmented region Eij, and a memory 206 for storing an integrated value (hereafter, referred to as the AF evaluation value) Iij by the integrating portion 205. The region setting portion 203 has a vertical synchronizing signal and a horizontal synchronizing signal generated by a synchronizing signal generating portion not shown inputted thereto, where the region setting by the region setting portion 203 and value extraction by the extracting portion 204 are performed in synchronization with these signals. The AF evaluation value Iij is a value indicating a degree of sharpness of the subject image in the segmented region Eij.

Figure 3:
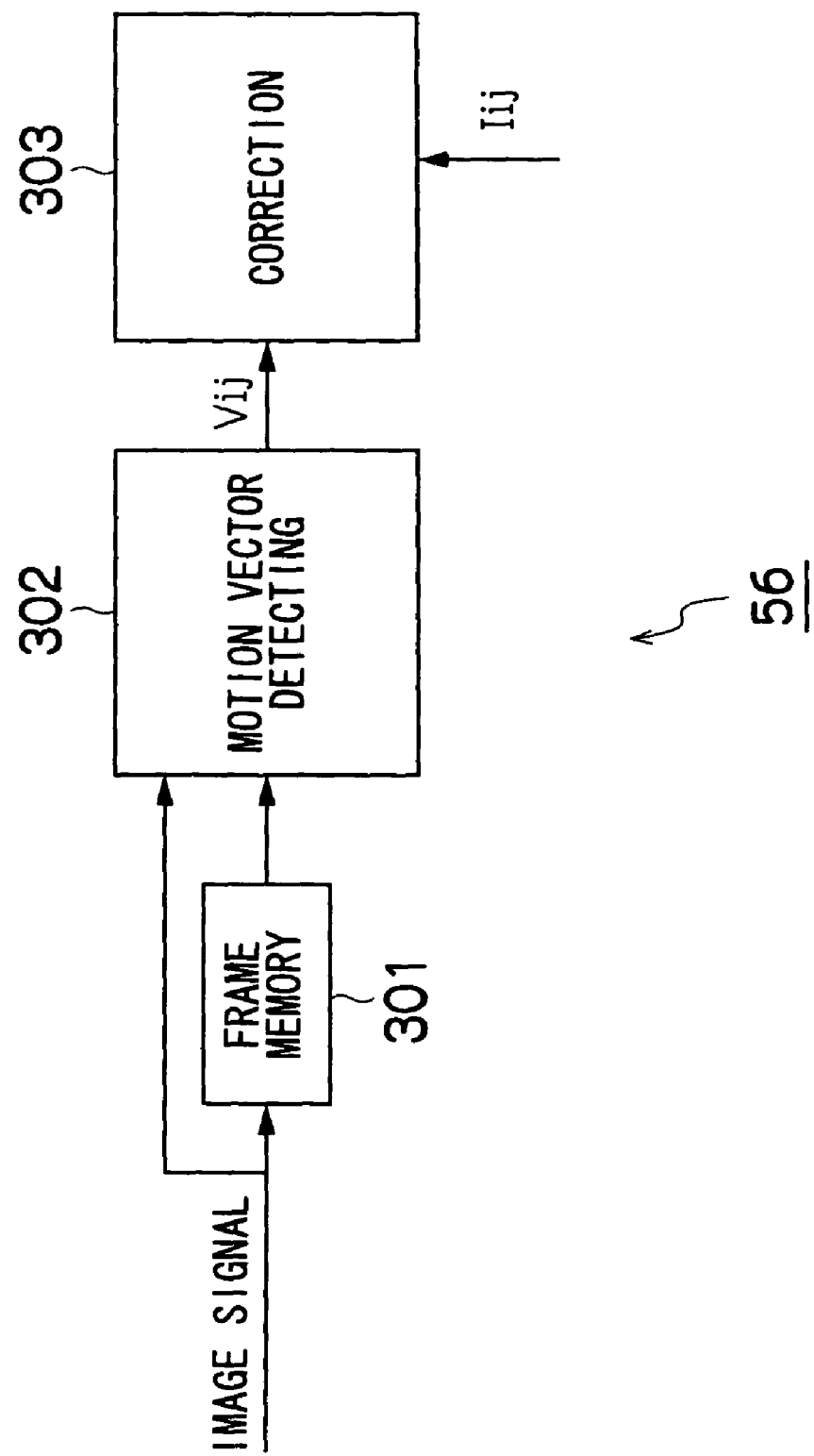
FIG. 3 is a block diagram of an image stabilizing circuit.

With reference to FIG. 3, an image stabilizing portion 56 inputs two image signals of which read times from the solid-state image sensor 102 are in tandem, and compares a previous frame image represented by a previous image signal to a current frame image represented by a current image signal so as to detect a motion vector. The current frame image is inputted to a motion vector detecting portion 302 from the SDRAM 54 while the previous frame image is inputted thereto from a frame memory 301 capable of storing the image data equivalent to one screen.

Here, the motion vector detecting portion 302 detects the motion vector for each of M×N pieces of segmented region Dij made by segmenting one screen of the frame image into M pieces in the horizontal (line) direction and N pieces in the vertical (row) direction. As for a relation between the segmented region Dij and the segmented region Eij, at least one of them should be incorporated in the other. Hereunder, a description will be based on M=P, N=Q and Dij=Eij for the sake of simplification.

A correction portion 303 inputs a motion vector Vij of each of the subject regions Dij and the AF evaluation value Iij of each of the subject regions Dij. The correction portion 303 decides a weighting coefficient $\alpha_{ij}$ of each motion vector Vij based on each AF evaluation value Iij. It is desirable that the weighting coefficient $\alpha_{ij}$ be decided so that its size correlates with the size of the AF evaluation value Iij.

For instance, the weighting coefficient $\alpha_{ij}$ may be a value in direct proportion to the AF evaluation value Iij. It is also possible to set the weighting coefficient $\alpha_{ij}$ to 0 in the case where the AF evaluation value Iij is less than a predetermined threshold and set the weighting coefficient $\alpha_{ij}$ to 1 in the case where the AF evaluation value Iij is equal to or more than the predetermined threshold. It is thereby possible to exclude the motion vector Vij of the subject region Dij of which the AF evaluation value Iij is less than a predetermined threshold V0 from determinant factors of the entire motion vector V.

For instance, $\alpha_{ij}=0$ ($3 \leq i \leq 5$, $2 \leq j \leq 4$) should desirably hold in FIG. 6 in order to exclude each of the motion vectors Vij of the matrix domain R of 3×3 consisting of the subject region Dij ($3 \leq i \leq 5$, $2 \leq j \leq 4$) passed by an object O2 unrelated to a subject O1 from determinant factors of the entire motion vector V.

The correction portion 303 decides the motion vector V of the entire current frame image based on the motion vector Vij and weighting coefficient $\alpha_{ij}$ of each of the subject regions Dij.

The entire motion vector V is decided by the following for instance.

$$v = \sum_i \sum_j \alpha_{ij} V_{ij} \bigg/ \sum_i \sum_j \alpha_{ij}$$

The correction portion 303 performs image stabilization to the image signal according to the entire motion vector V. For instance, it makes a correction for emphasizing an edge in a direction approximately orthogonal to the entire motion vector V. Besides, an unsharp masking correction may also be made, where a secondary differentiation image (Laplacian image) of the current signal is subtracted from the current signal.

A flow of motion control over the AF evaluation value calculation and image stabilization by the CPU 110 is as follows.

Figure 4:
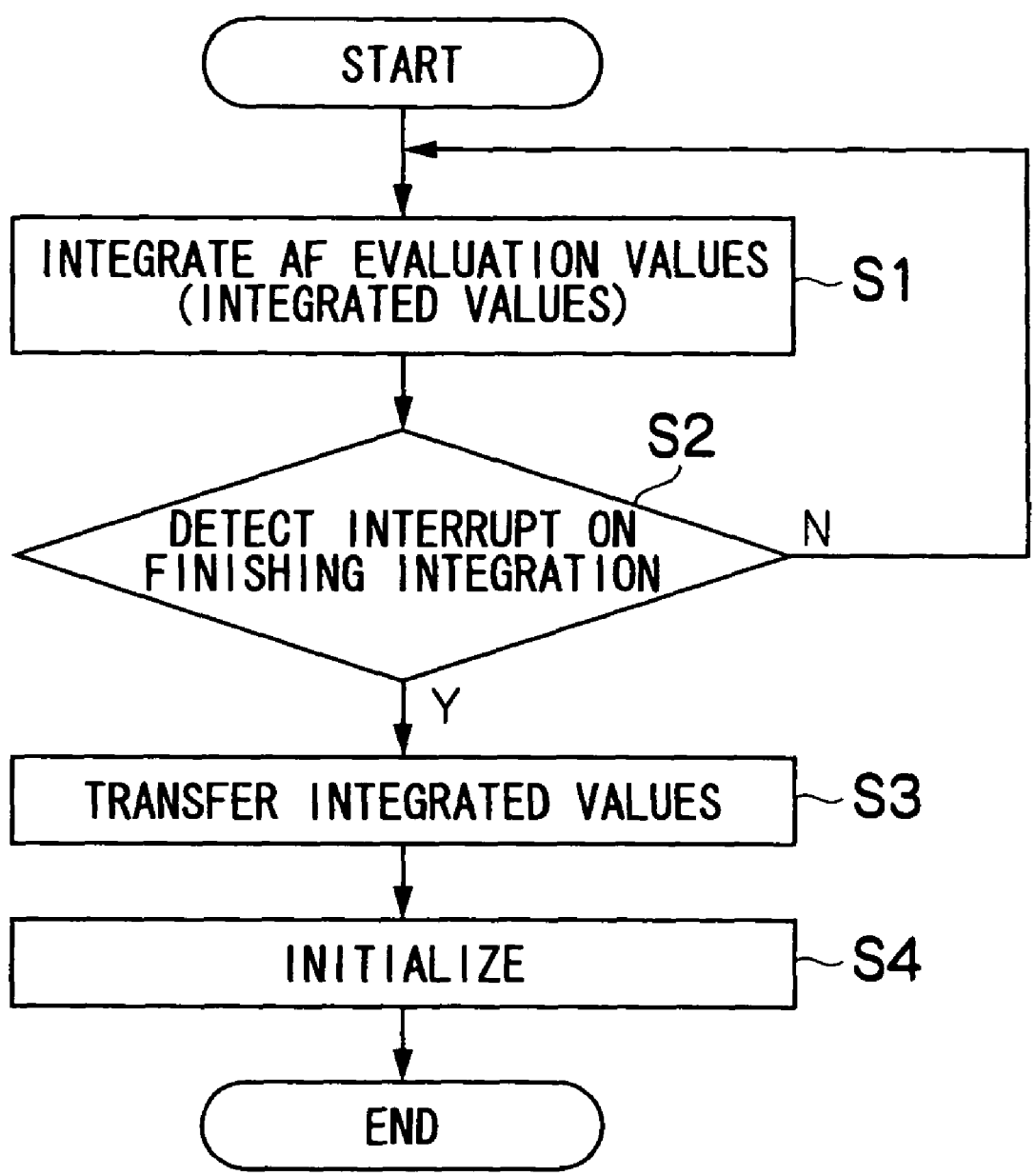
FIG. 4 is a flowchart showing a flow of operational control over the AF detection circuit by a CPU.

FIG. 4 shows the flow of operational control over the AF detection circuit 136 by the CPU 110. First, the CPU 110 outputs a control signal for calculating the AF evaluation value to the AF detection circuit 136 in synchronization with completion of reading of the images equivalent to one frame. In response to input of the signal, the AF detection circuit 136 calculates each of the AF evaluation values Iij from the read images equivalent to one frame (S1).

The CPU 110 outputs an AF evaluation value calculation interrupt signal to the AF detection circuit 136 in synchronization with timing for starting reading the images equivalent to one frame. On inputting the signal ("Y" of S2), the AF detection circuit 136 transfers each of the AF evaluation values Iij to the image stabilizing portion 56 (S3).

The AF detection circuit 136 initializes the memory 206 and renders it capable of storing the AF evaluation values Iij about the images equivalent to the next one frame. The operation of S1 to S4 is repeated as long as reading of the image signals continues.

Figure 5:
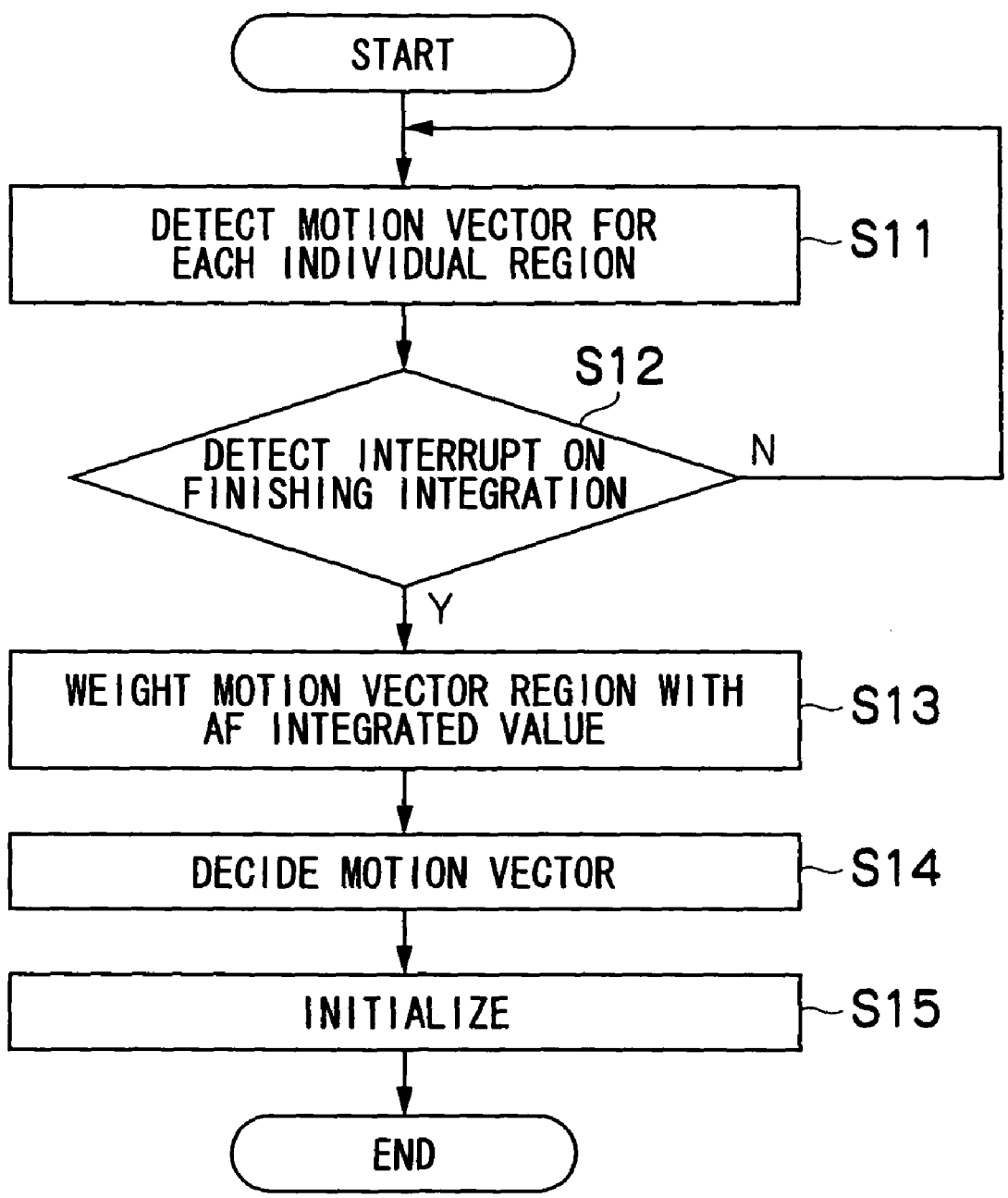
FIG. 5 is a flowchart showing the flow of operational control over an image stabilizing portion by the CPU.

FIG. 5 shows the flow of operational control over the image stabilizing portion 56 by the CPU 110.

First, the CPU 110 outputs to the image stabilizing portion 56 a control signal for calculating the motion vector Vij of each of the subject regions Dij in synchronization with completion of reading of the images equivalent to one frame. In response to input of the control signal, the image stabilizing portion 56 calculates the motion vector Vij of each of the subject regions Dij.

The CPU 110 outputs the AF evaluation value calculation interrupt signal to the image stabilizing portion 56 in synchronization with timing for starting reading the images equivalent to the next one frame. On inputting the signal ("Y" of S12), the image stabilizing portion 56 stands by for input of the AF evaluation value Iij. If the AF evaluation value Iij is inputted from the AF detection circuit 136, the image stabilizing portion 56 decides the weighting coefficient αij of each motion vector Vij based on the AF evaluation value Iij so as to decide the entire motion vector V according to the weighting coefficient αij and motion vector Vij (S14). The correction portion 303 performs the image stabilization to the image signal according to the entire motion vector V.

The image stabilizing portion 56 initializes the frame memory 301 and renders it capable of storing the images equivalent to the next one frame (S15). The operation of S11 to S15 is repeated as long as reading of the images continues.

As described above, the motion vector Vij is weighted by the weighting coefficient αij of the motion vector Vij decided based on the AF evaluation value Iij indicating the degree of sharpness of the subject image so as to decide the entire motion vector V. For this reason, it is possible to reduce an influence on the decision of the motion vector V of the entire image exerted by the motion vector of the object of a low degree of sharpness, that is, the object not focused on.

What is claimed is:

1. An image pickup apparatus, comprising
an imaging portion which photoelectrically converts a subject image and obtains a frame image of a subject;
a first motion vector deciding portion which decides a motion vector Vij of each of segmented regions Dij (i=1 to M, j=1 to N) made by segmenting the frame image of the subject obtained by the imaging portion into multiple matrix domains of M lines×N rows;
an auto focus (AF) evaluation value calculating portion which calculates an AF evaluation value indicating a degree of sharpness of the subject image from the frame image of the subject obtained by the imaging portion;
a coefficient deciding portion which decides a weighting coefficient αij of each motion vector Vij based on the AF evaluation value calculated by the AF evaluation value calculating portion; and
a second motion vector deciding portion which decides an entire motion vector V of the frame image of the subject by weighting the motion vector Vij based on the weighting coefficient αij,
wherein the entire motion vector V is decided by the following $$V = \sum_i \sum_j \alpha_{ij} V_{ij} \Big/ \sum_i \sum_j \alpha_{ij}.$$

2. An image pickup apparatus, comprising:
an imaging portion which photoelectrically converts a subject image and obtains a frame image of a subject;
a first motion vector deciding portion which decides a motion vector Vij of each of segmented regions Dij (i=1 to M,j=1 to N) made by segmenting the frame image of the subject obtained by the imaging portion into multiple matrix domains of M lines×N rows:
an auto focus (AF) evaluation value calculating portion which calculates an AF evaluation value indicating a degree of sharpness of the subject image from the frame image of the subject obtained by the imaging portion;
a coefficient deciding portion which decides a weighting coefficient αij of each motion vector Vij based on the AF evaluation value calculated by the AF evaluation value calculating portion; and
a second motion vector deciding portion which decides an entire motion vector V of the frame image of the subject by weighting the motion vector Vij based on the weighting coefficient αij,
wherein the AF evaluation value calculating portion calculates an AF evaluation value Iij indicating the degree of sharpness of the subject image in the segmented region Dij,
and
the coefficient deciding portion decides the weighting coefficient αij of each motion vector Vij based on the AF evaluation value Iij,
wherein the entire motion vector V is decided by the following $$V = \sum_i \sum_j \alpha_{ij} V_{ij} \Big/ \sum_i \sum_j \alpha_{ij}.$$

3. An image pickup apparatus, comprising:
an imaging portion which photoelectrically converts a subject image and obtains a frame image of a subject;
a first motion vector deciding portion which decides a motion vector Vij of each of segmented regions Dij (i=1 to M,j=1 to N) made by segmenting the frame image of the subject obtained by the imaging portion into multiple matrix domains of M lines×N rows;
an auto focus (AF) evaluation value calculating portion which calculates an AF evaluation value indicating a degree of sharpness of the subject image from the frame image of the subject obtained by the imaging portion;
a coefficient deciding portion which decides a weighting coefficient αij of each motion vector Vij based on the AF evaluation value calculated by the AF evaluation value calculating portion; and
a second motion vector deciding portion which decides an entire motion vector V of the frame image of the subject by weighting the motion vector Vij based on the weighting coefficient αij,
wherein the AF evaluation value calculating portion calculates an AF evaluation value Iij indicating the degree of sharpness of the subject image in the segmented region Dij,
and
the coefficient deciding portion decides the weighting coefficient αij of each motion vector Vij based on the AF evaluation value Iij,
wherein the coefficient deciding portion decides the weighting coefficient αij so that a size of the coefficient correlates with a size of the AF evaluation value Iij, and
wherein the entire motion vector V is decided by the following $$V = \sum_i \sum_j \alpha_{ij} V_{ij} \Big/ \sum_i \sum_j \alpha_{ij}.$$

* * * * *